United States Patent [19]

Coq et al.

[11] 4,443,574

[45] Apr. 17, 1984

[54] COATING COMPOSITION OF POLY(ARYLENE SULFIDE), POLYTETRAFLUOROETHYLENE AND BARIUM OR CALCIUM SULFATE

[75] Inventors: Jean-Louis G. Coq, Court-St-Etienne; Herman E. Seymus, Lint, both of Belgium

[73] Assignee: E. I. Du Pont de Nemours and Company, Wilmington, Del.

[21] Appl. No.: 443,059

[22] Filed: Nov. 19, 1982

[51] Int. Cl.$^3$ ............................ C08K 3/30; C08K 3/24
[52] U.S. Cl. .................................. 524/423; 524/502; 428/422

[58] Field of Search ................. 524/423, 502; 428/422

[56] References Cited

U.S. PATENT DOCUMENTS 4,130,675 12/1978 Vassiliou et al.
4,212,922 7/1980 Tieszen.

Primary Examiner—Lewis T. Jacobs
Attorney, Agent, or Firm—Richard H. Burgess

[57] ABSTRACT

Coating compositions of poly(arylene sulfide) and polytetrafluoroethylene have enhanced adhesion to substrates when they include barium or calcium sulfate, especially for coil coating use on cookware.

11 Claims, No Drawings

COATING COMPOSITION OF POLY(ARYLENE SULFIDE), POLYTETRAFLUOROETHYLENE AND BARIUM OR CALCIUM SULFATE

BACKGROUND

Poly(arylene sulfide) coating compositions such as poly(phenylene sulfide) (PPS) are well known for use on cookware, including such coatings which also contain fluorocarbon resins such as polytetrafluoroethylene (PTFE) and other perfluorinated resins.

U.S. Pat. No. 4,212,922—Tieszen (July 15, 1980) discloses PPS-based coating compositions containing manganese dioxide to improve adhesion. U.S. Pat. No. 4,130,675—Vassiliou and Welch (Dec. 19, 1978) discloses PPS-based coating compositions containing a citrate, carbonate, sulfate or hydroxide of an alkali metal to reduce discoloration of such compositions, which optionally also contain PTFA. Both of these patents are incorporated herein by reference.

It is desirable to have available coating compositions of PPS and PTFE having even better adherence to substrates and other properties.

SUMMARY OF THE INVENTION

The present invention provides, a coating composition comprising poly(arylene sulfide), polytetrafluoroethylene, at least one of barium and calcium sulfates and a liquid carrier, wherein the weight ratio of poly(arylene sulfide) to polytetrafluoroethylene is from 50:50 to 85:15, preferably 60:40 to 80:20, most desirably 70:30, and the weight ratio of the sulfates to poly(arylene sulfide) plus polytetrafluoroethylene is from 10:100 to 60:100, preferably 20:100 to 40:100, most desirably 30:100.

Other embodiments of the invention include substrates such as aluminum cookware coated with such coatings, especially by coil coating techniques.

DETAILED DESCRIPTION

Tests have shown that the addition of barium sulfate to PPS-PTFE coatings gives superior adhesion, facilitating the application of coatings by continuous coil coating techniques known in the art to coiled strip of metal such as aluminum, tin-plated steel, $Cr_2O_3$-treated mild steel or other metals. Such coated strip can be subsequently formed into useful articles such as cookware including bakeware like bread pans, muffin tins, cookie sheets, etc., while maintaining good nonstick performance, especially for baking starchy foods at temperatures up to 230° C. The resulting coatings can be formulated to give good translucence for light or dark coatings. The coatings can also be applied to cast aluminum by spraying. The similar refractive indices and other properties of calcium sulfate or gypsum make it also desirable for use in the invention. Magnesium sulfate would not be expected to be a suitable substitute, especially for cookware coatings.

In addition to the stated ingredients, the coating compositions can include adjuvants such as those which do not substantially change the basic and novel characteristics of the invention of permitting coil coating with improved adhesion. Such adjuvants can include pigments, extenders, solvents, coupling agents, rheology control agents, surfactants and other materials.

In the example, parts, proportions and percentages are given by weight except where indicated otherwise.

EXAMPLE

Intermediate bases 1-4 shown in the Table are prepared separately by mixing as known in the art, and then are mixed together to form the coating composition. The preferred PTFE powder is Fluon 171 irradiated micropowder from Imperial Chemical Industries of England. It has a melt viscosity of about $10^4$ poises and an average primer particle size of about 0.1 μm, although agglomeration may occur and can be broken up. The preferred PPS is Ryton V-1 available from Phillips Petroleum Co. Triton X-100 is a nonionic surface active agent of alkyl phenoxypoly(ethylenoxy)ethanol from Rohm and Haas Co. Dispergine GBA is a condensation product of ammonium naphthylsulfonate from Ugine Kuhlmaan of France. The aluminum flake used is from Silberline Co. The preferred barium sulfate is Blancfixe, with an average particle size of 0.8 μm, available from the Sachtleben firm in West Germany. Pearl Afflair is a pigment of mica platelets coated with titanium dioxide particles. It is available from E. M. Laboratories, Inc. of Elmsford, New York.

TABLE

| Ingredient | Parts by Weight |
| --- | --- |
| 1. Organic black dispersion | |
| carbon black | 0.13 |
| ethylene glycol | 0.53 |
| "Dispergine" CBA | 0.01 |
| 2. PPS/PTFE dispersion | |
| ethylene glycolmonobutyl ether | 24.51 |
| ethylene glycol | 29.69 |
| Triton X-100 | 2.13 |
| PPS "Ryton" V-1 | 14.87 |
| PTFE "Fluon" L171 | 6.37 |
| "Pearl Afflair" pigment | 0.05 |
| barium sulphate-micronized | 7.53 |
| 3. Aluminium dispersion | |
| ethylene glycol monobutyl ether | 1.93 |
| ethylene glycol | 2.36 |
| aluminium paste extra coarse bright | 4.30 |
| 4. Cobalt blue dispersion | |
| ethylene glycol | 2.79 |
| cobalt blue | 2.79 |

The resulting coating compositions can be applied by normal coil coating or spraying techniques, dried and cured at 130° C. for 1.5-2 minutes. Bakeware formed from such coil-coated aluminum strip gave good release of starchy foods and superior adhesion compared to similar coating compositions not including the barium sulfate.

We claim:

1. A coating composition comprising poly(arylene sulfide), polytetrafluoroethylene, at least one of barium and calcium sulfates and a liquid carrier, wherein
   the weight ratio of poly(arylene sulfide) to polytetrafluoroethylene is from 50:50 to 85:15, and
   the weight ratio of the sulfates to poly(arylene sulfide) plus polytetrafluoroethylene is from 10:100 to 60:100.

2. The coating composition of claim 1 wherein the poly(arylene sulfide) is a poly(phenylene sulfide) and the sulfate is barium sulfate.

3. The coating composition of claim 2 wherein the weight ratio of poly(phenylene sulfide) is from 60:40 to 80:20.

4. The coating composition of claim 2 wherein the weight ratio of poly(phenylene sulfide is about 70:30.

5. The coating composition of claim 2 wherein the weight ratio of barium sulfate to poly(phenylene sulfide) plus polytetrafluoroethylene is from 20:100 to 40:100.

6. The coating composition of claim 5 wherein the weight ratio of barium sulfate to poly(phenylene sulfide) plus polytetrafluoroethylene is about 30:100.

7. The coating composition of claim 2 wherein
the weight ratio of poly(phenylene sulfide) is from 60:40 to 80:20, and
the weight ratio of barium sulfate to poly(phenylene sulfide) plus polytetrafluoroethylene is from 20:100 to 40:100.

8. The coating composition of claim 7 wherein
the weight ratio of poly(phenylene sulfide) is about 70:30, and
the weight ratio of barium sulfate to poly(phenylene sulfide) plus polytetrafluoroethylene is about 30:100.

9. A substrate coated with a dried and cured coating derived from the coating composition of claim 2.

10. An article of cookware comprising a coated aluminum substrate of claim 9.

11. A method of producing a coated substrate of claim 9 wherein the coating composition is applied to the substrate by coil coating.

* * * * *